United States Patent
Manoj

(10) Patent No.: US 7,853,751 B2
(45) Date of Patent: Dec. 14, 2010

(54) STRIPE CACHING AND DATA READ AHEAD

(75) Inventor: Jose K. Manoj, Lilburn, GA (US)

(73) Assignee: LSI Corporation, Milpitas, CA (US)

( * ) Notice: Subject to any disclaimer, the term of this patent is extended or adjusted under 35 U.S.C. 154(b) by 493 days.

(21) Appl. No.: 12/046,676

(22) Filed: Mar. 12, 2008

(65) Prior Publication Data

US 2009/0235023 A1    Sep. 17, 2009

(51) Int. Cl.
*G06F 12/00* (2006.01)
(52) U.S. Cl. .................................... 711/114
(58) Field of Classification Search ............. None
See application file for complete search history.

(56) References Cited

U.S. PATENT DOCUMENTS

| 5,315,602 | A  | * | 5/1994 | Noya et al. ............... 714/766 |
| 7,076,606 | B2 | * | 7/2006 | Orsley ....................... 711/114 |
| 2004/0068612 | A1 | * | 4/2004 | Stolowitz ................... 711/114 |
| 2006/0036904 | A1 | * | 2/2006 | Yang ............................ 714/7 |
| 2008/0040553 | A1 | * | 2/2008 | Ash et al. ................... 711/133 |

* cited by examiner

*Primary Examiner*—Hiep T Nguyen
(74) *Attorney, Agent, or Firm*—Luedeka, Neely & Graham, P.C.

(57) ABSTRACT

A method of improving a serial IO operation, where the serial IO operation includes at least one of a read operation of a data block and a write operation of a data block, and the serial IO operation is directed to a logical disk of a computerized data storage system. Only one stripe of data is read from the logical disk into a cache, and it is determined whether the data block for the IO operation is included within the cache. When the data block for the IO operation is included within the cache, then for a read operation, the IO operation is serviced from the cache. For a write operation, the cache is updated with the data block to be written, and only an updated parity block is written to the logical disk. When the data block for the IO operation is not included within the cache, then for a read operation, only one new stripe of data that includes the data block is read from the logical disk into the cache, and the IO operation is serviced from the cache. For a write operation, only one new stripe of data that excludes the data block is read from the logical disk into the cache, the cache is updated with the data block to be written, and only an updated parity block is written to the logical disk.

4 Claims, 3 Drawing Sheets

STRIPE CACHING AND DATA READ AHEAD

FIELD

This invention relates to the field of computer programming. More particularly, this invention relates to a system for improving the efficiency of disk read operations and disk write operations.

BACKGROUND

The efficiency of either reading or writing relatively small blocks of data from and to a hard drive system, such as a RAID, tends to be much less than the efficiency of the same operations for relatively large blocks of data. These read and write requests are generally referred to as IO requests herein, and the data is generally referred to as IO herein. One reason for this reduced efficiency is that a relatively greater number of interrupts and IO requests are generated for smaller IO blocks than are generated for larger IO blocks. This increases the utilization of the central processing unit, and generally reduces the total IO throughput rate. In many disc operations, such as RAID logical drive read operations, the driver may read from more than one drive. Sometimes the IO falls on the same drive and results in multiple reads or writes from and to the same strip of data on a given drive.

One way to increase the efficiency of a driver is to use what is called "command coalescing." Command coalescing is a technique that reduces the number of IO requests and thereby increases system throughput. Command coalescing is implemented by holding a number of IO requests, and then performing them all at once. The intention is that some of the requests are for data that is overlapping or contiguous, so that only a single larger IO request can be processed for those blocks, instead of the multiple smaller requests that were originally received by the driver. However, for this technique to be implemented, the driver must be able to store a relatively large number of outstanding IO commands, in order to increase the probability of effective coalescing of the commands.

Unfortunately, low level software drivers, such as those for RAIDs, are typically allowed access to only a relatively limited amount of memory resources and, therefore, it is advisable to reduce the number of interrupts in the system to increase the throughput of the system. Thus, software drivers such as these typically have IO size limitations, and can only handle a relatively small number of outstanding commands at the same time. If the IO size is small and the driver can only handle a small number of outstanding IO requests, then the possibility of gaining any improvements in efficiency through command coalescence is relatively small.

What is needed, therefore, is a system that overcomes problems such as those described above, at least in part.

SUMMARY

The above and other needs are met by a method of improving a serial IO operation, where the serial IO operation includes at least one of a read operation of a data block and a write operation of a data block, and the serial IO operation is directed to a logical disk of a computerized data storage system. Only one stripe of data is read from the logical disk into a cache, and it is determined whether the data block for the IO operation is included within the cache. When the data block for the IO operation is included within the cache, then for a read operation, the IO operation is serviced from the cache. For a write operation, the cache is updated with the data block to be written, and only an updated parity block is written to the logical disk. When the data block for the IO operation is not included within the cache, then for a read operation, only one new stripe of data, including the data block, is read from the logical disk into the cache, and the IO operation is serviced from the cache. For a write operation, only one new stripe of data, excluding the data block, is read from the logical disk into the cache, the cache is updated with the data block to be written, and only an updated parity block is written to the logical disk.

In this manner, the method only requires an amount of memory equal to one data stripe, which is less memory than would be required for prior art IO request coalescing techniques. Even so, however, this method provides adequate gains in driver performance.

According to another aspect of the invention there is described a computer readable medium containing a low level device driver program, where the program has logic elements for performing a serial IO operation, where the serial IO operation includes at least one of a read operation of a data block and a write operation of a data block, and the serial IO operation is directed to a logical disk of a computerized data storage system. Only one stripe of data is read from the logical disk into a cache, and it is determined whether the data block for the IO operation is included within the cache. When the data block for the IO operation is included within the cache, then for a read operation, the IO operation is serviced from the cache. For a write operation, the cache is updated with the data block to be written, and only an updated parity block is written to the logical disk. When the data block for the IO operation is not included within the cache, then for a read operation, only one new stripe of data, including the data block, is read from the logical disk into the cache, and the IO operation is serviced from the cache. For a write operation, only one new stripe of data, excluding the data block, is read from the logical disk into the cache, the cache is updated with the data block to be written, and only an updated parity block is written to the logical disk.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Various embodiments of the present invention provide a simple read ahead and data caching layer that generally improves sequential read performance for small IO sizes on any logical drive (such as any RAID), and also generally improves sequential write performance for small IO sizes on RAID5 logical drives. Some embodiments are especially useful on SoftRAID products and RAID firmware solutions.

Figure 3:
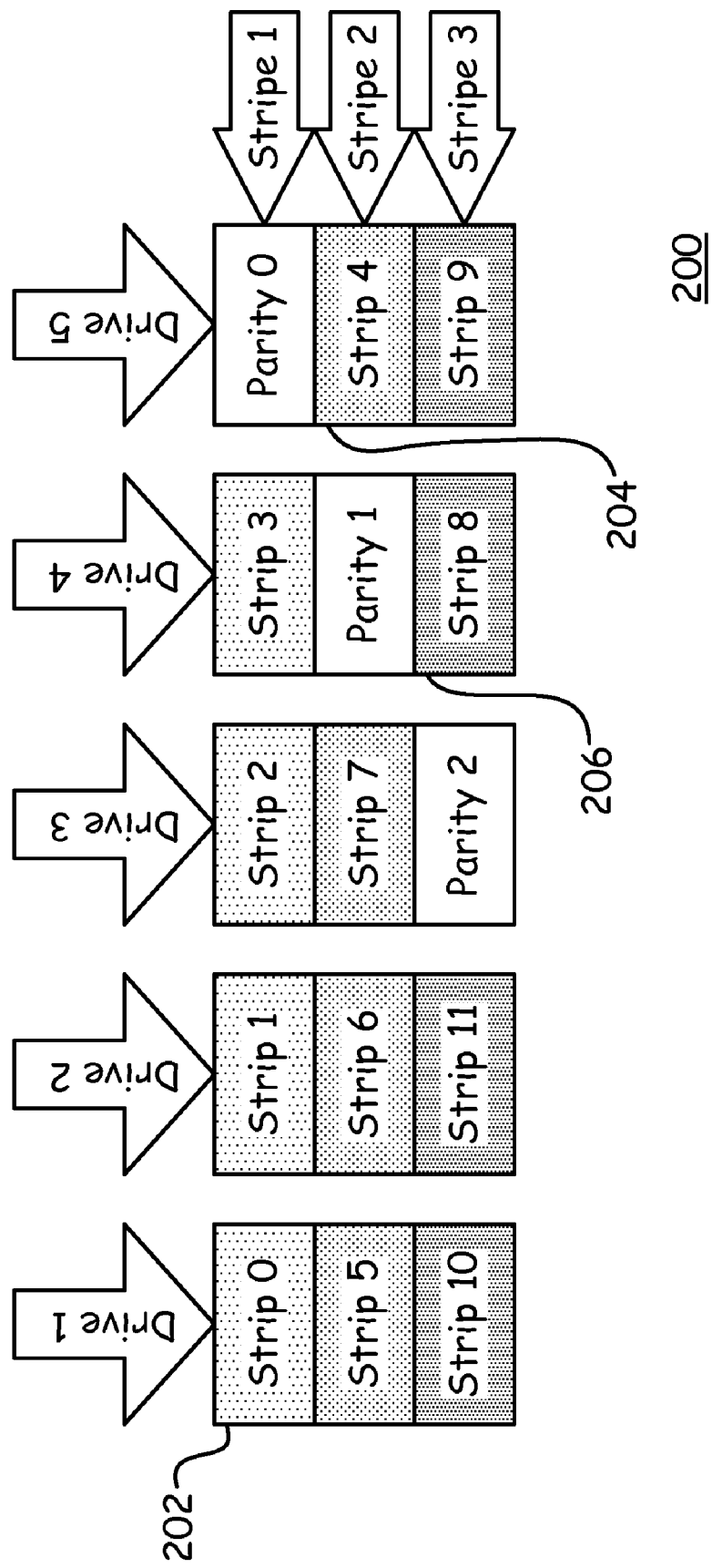
FIG. 3 is a graphical representation of a prior art RAID5 configuration.

FIG. 3 depicts a graphical representation of the logical drive stripe and strip layout for a RAID5 drive configuration. This example is used to help define the terms that are used herein. In this particular example, five drives (1-5) are participating in a logical drive, and are represented by the columns in the representation. Three stripes (1-3) are represented in the rows. Twelve individual data blocks, listed as strips 0-11, are also depicted, with three parity strips (0-2)—one for each stripe—also shown.

The present design improves serial read and serial write performance with a method called "Read Ahead and Stripe Data Caching" (RASDC). According to one aspect of the present invention, a caching layer is implemented that caches just one stripe of data, so as to increase the IO performance for an IO size that is less than one full stripe. This design also describes when to invoke and start the operation of the RASDC module. For example, if the incoming IO size is more than or equal to a stripe, then the driver is already running in a fully loaded form and providing its optimal throughput, so the system according to the present invention would not be implemented for those IO requests. Resource usage for the various embodiments is carefully controlled to generally achieve the greatest benefits from the least amount of resources.

According to one embodiment, if the RAID drivers receive a number of serial read operations, or a write operation for an IO size that is less than one stripe (only for R5 and R6), then the RASDC module is invoked. When any command with an IO size that is greater than one stripe or that is not serial with the previous command is received, then the RASDC module frees up the cached stripe data and stops its operation. Read and RAID5 write operations are separately explained in more detail below.

Read Operation

Figure 1:
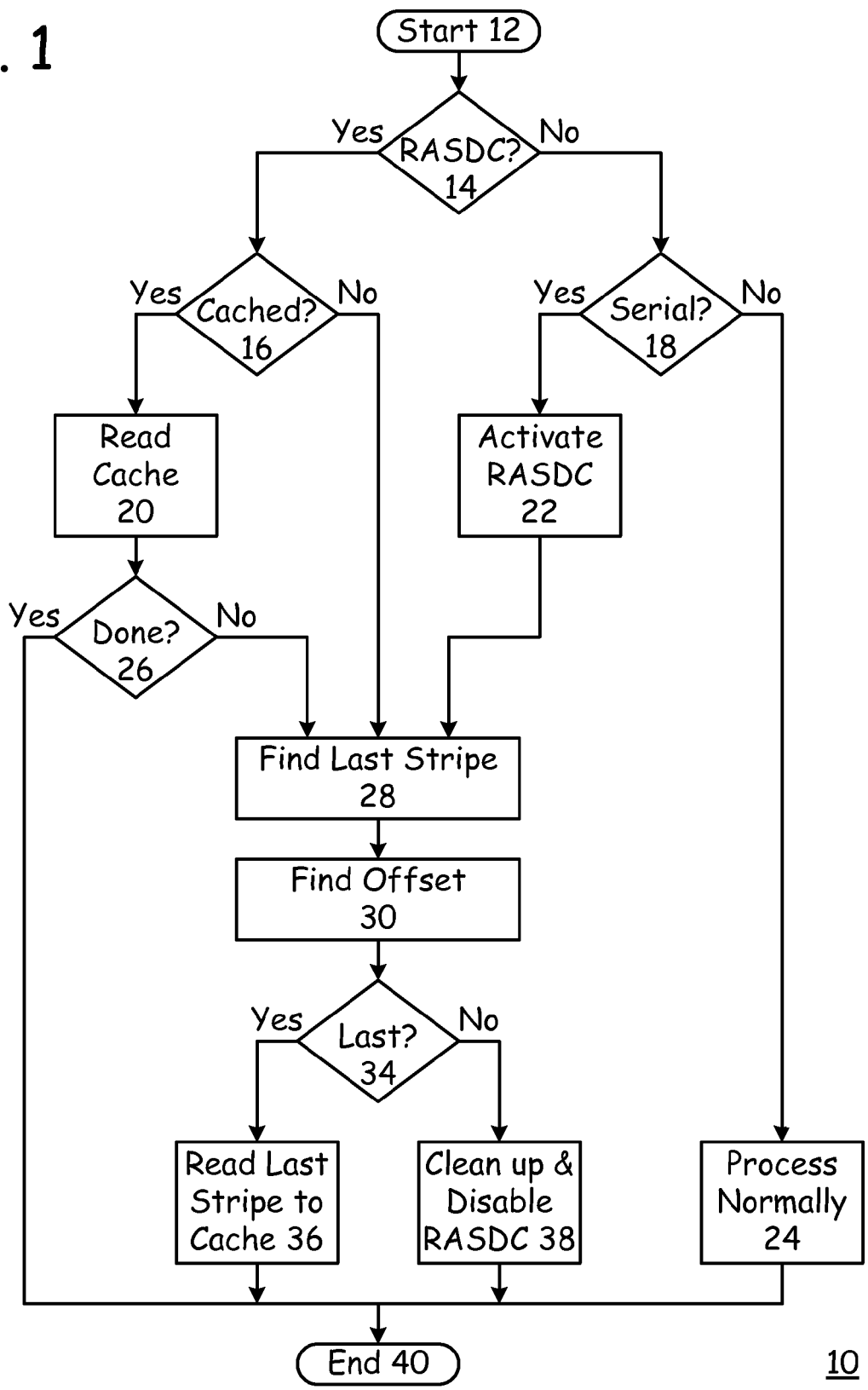
FIG. 1 is a flow chart of a serial read operation according to an embodiment of the present invention.

With reference now to FIG. 1, there is depicted a flow chart for one embodiment of a serial read operation 10 according to the present invention. The description below is in regard to this embodiment. However, it is appreciated that other embodiments within the scope of the present invention are also possible.

The RASDC module starts as given in block 12. The first consideration is whether the RASDS module is currently being used for the read operation, as given in block 14. If it is, then control passes to decision block 16, where it is determined whether any of the data to be read currently resides within the RASDC cache. If some of the data is in the RASDC cache, then this data is read from the cache, as given in block 20. If the read operation is done, as determined in decision block 26, then the process ends, as given in block 40.

If none of the data to be read is disposed in the RASDC cache, as determined in block 16, or if the read operation cannot be completed from the data in the cache (because, for example, not all of the desired data was in the cache), as determined in block 26, then control passes to block 28, which is described in more detail at a later point hereafter.

Going back to decision block 14, if the RASDC module has not already been implemented, then control falls to decision block 18, where it is determined whether the read operation is a serial read operation. If it is not, then control falls to block 24, and a read operation according to the normal operation of the controller is implemented, as indicated in block 24, and the process ends as given in block 40. A normal read operation indicates that the RASDC operation is not implanted.

If, however, the RASDC mode is not currently implemented (as determined in block 14) and a serial read operation is called (as determined in block 18), then the RASDC module is activated as given in block 22, and control falls to block 28. Thus, as depicted in the method 10, there are three entry points into bock 28, which is where a new read operation is started. A new read operation is implemented by the RASDC module when the RASDC module had not been used for the previous read operation, none of the requested data was in the RASDC cache, or not all of the requested data was in the RASDC cache.

In block 28, the RASDC finds the last stripe of the logical drive on which the read command falls. Then an offset to the actual data requested is determined as given in block 30. In decision block 34, it is determined whether the offset points to a position within the last stripe of data. If the offset is within the last data stripe, then a complete stripe read is performed on the last stripe on which the requested IO is falling, which read is done irrespective of the actual IO request size, as given in block 36. The RASDC module keeps this complete stripe data in its local memory until one of the subsequent read operations crosses into the next stripe. If the offset is not within the last stripe of data, then control falls to block 38, where the RASDC cache is cleaned out and the RASDC module is disabled.

As described above in regard to blocks 14, 16, and 20, if the RASDC module is active and the stripe data is available, then all the read requests first check for the availability of the data in RASDC cache. If the RASDC module can provide all of the data for the request from the cache, then the read command is completed from the RASDC module itself. If only a part of the data is available in the RASDC cache, then whatever is available in the cache is provided, and rest of the data is read directly from the disc drives.

If the 10 request is for data that crosses into the next stripe of the logical drive, then the RASDC module discards the previous stripe of data, and tries to completely read the next stripe of data into its cache, and preserve the data for future use. This process continues until the RASDC module receives a read command that is bigger than the stripe size or is not serial in nature. Until one of those two events occurs, the operation of the RASDC module continues until the final IO request is received, at which point the RASDC module is cleaned up and the driver unloads.

Write Operation

Figure 2:
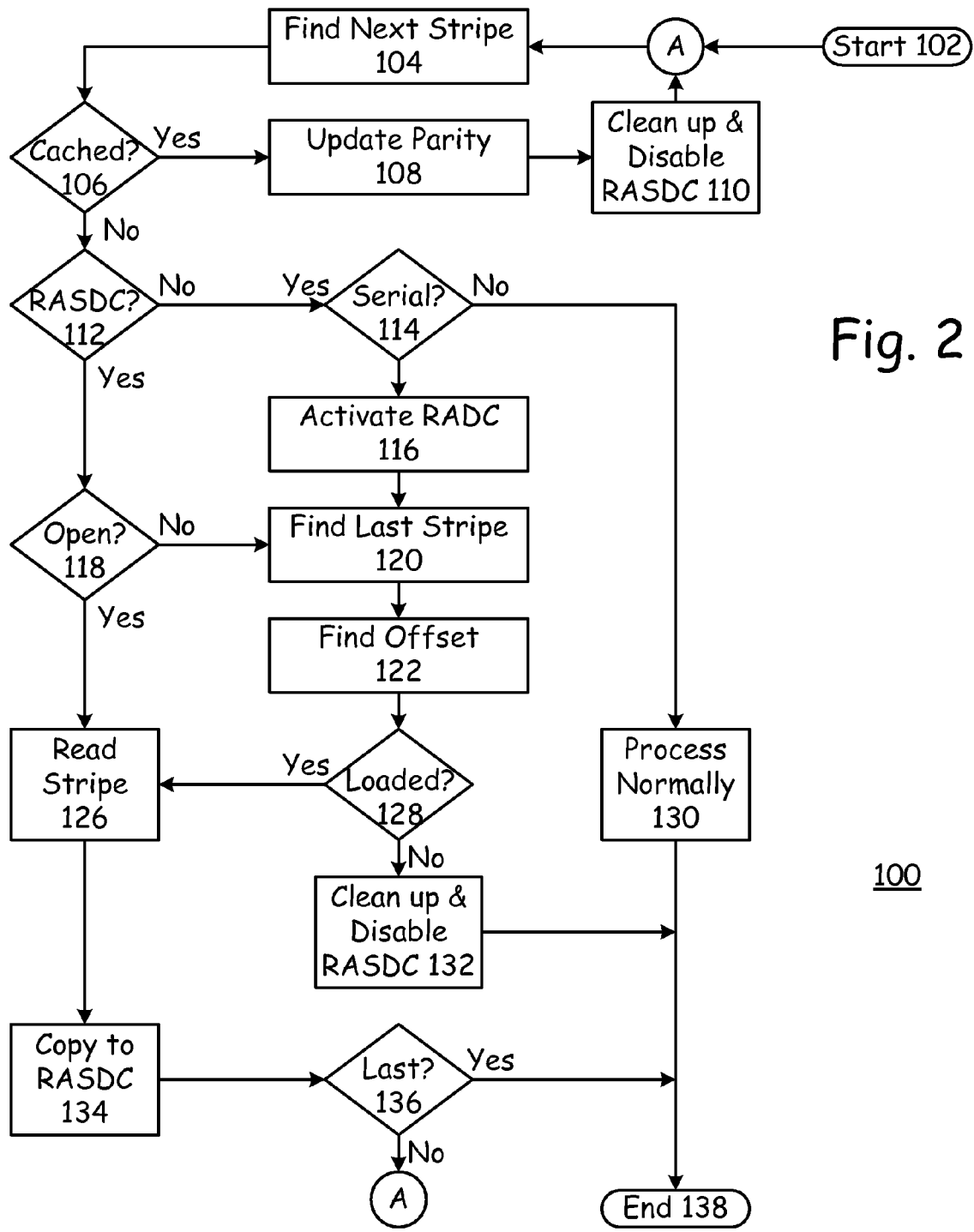
FIG. 2 is a flow chart of a serial write operation according to an embodiment of the present invention.

With reference now to FIG. 2, a flow chart 100 of an embodiment of the present invention for RAID5 write operations is depicted. By using cached data software drivers according to the present invention, peer reads and parity reads can be avoided. In the specific case of a RAID5 write command, as depicted in FIG. 2, the operation of the RASDC module is not too different from that as described above, and starts with block 102. The "A" circle is merely an entry marker for convenience is the drawing of the flow chart 100.

In block 104, the stripe wherein the next read command received by the system 100 is determined. It is next determined whether this stripe is already in the RASDC cache, as given in block 106. If this stripe is already in the cache, then it is updated, and the updated parity strip is written to the logical disk, as given in block 108. After this, the RASDC stripe cache is cleaned up, and the RASDC module is disabled, as given in block 10. Control then passes back to the entry of the process, as given at A.

If the complete stripe data is not available, as determined in decision block 106, then it is next determined whether the RASDC module is active, as given in block 112. If the RASDC module is active, then it is next determined whether the RASDC cache is available for processing of the stripe, as given in block 118. If so, then a complete read of the last stripe is performed, as given in block 126. The data contained in the incoming write command can be excluded from the read operation, as it will not be used. The read data is copied to the RASDC cache, as given in block 134, and the cache data is updated with the data from the new write operation. New parity data is generated from the updated cache. It this is the last operating stripe, as determined in decision block 136, then the process ends as given in block 138. However, if not, then control passes back to entry point A.

Returning now to decision block 112, if the RASDC module is not active, then it is next determined whether the criteria for entering the RASDC exist, as given in decision block 114. These criteria include whether less than an entire stripe of data is to be written per the new write command, and if it is a serial write command. If the criteria are not met, then control passes to block 130 where the command processes normally (without use of the RASDC module), and exits the process as given in block 138.

However, if the criteria as determined in decision block 114 are met, then the RASDC module is activated, as given in block 116, and memory is allocated for the RASDC stripe cache. Block 120 can then either be entered after the RASDC module is activated in block 116, or if it is determined in decision block 118 that the RASDC cache was not available for the processing of the stripe. In block 120, the last stripe is found on which the new write command is to be performed. Then the offset for the data write command is determined, as given in block 122.

If the offset into this stripe starts at LBA zero, then control passes to block 128, which operates as previously described. Otherwise, control passes to block 132, and the RASDC stripe cache is cleaned up, and the RASDC module is disabled, and the process ends as given in block 138.

In another embodiment, if serial write commands are detected by the RASDC module, then a complete stripe read (excluding the parity data) is performed on the last stripe on which the IO request falls. The data that is coming in with the new write command can be skipped when reading the stripe on the logical drive. The RASDC module generates new data for the complete stripe by overwriting or otherwise combining the data that is read from the stripe with the data that is received through the incoming write command. New parity data is then generated from the data in the RASDC cache, and the new parity data is written to the drives. The RASDC module keeps the complete updated stripe data (including the parity data) in its local memory until a subsequent write operation crosses into the next stripe.

If the RASDC module is active when a write command is received, then the RASDC cache is checked to see if it contains the data for all of the new write requests. If the new write command only affects data in the stripe currently in the RASDC cache, then the existing data and parity are provided from the RASDC cached data area, and no drive access needs to be performed. However, if the new write command effects data that falls into two different stripes, then the data stripe in the RASDC cache is processed immediately and written to the drives. The RADC module then discards the cached data and the next stripe is completely read into the cache. This process continues until the RASDC receives a write command that is equal to or bigger than one full stripe in size, or until it receives a write command that is not serial. Otherwise, operation continues as described above until the last IO request is received, at which point the RASDC module is cleaned up when the system unloads.

Thus, the embodiments of the present invention reduce the number of read operations in serial read commands on any raid level. They further reduce the number of interrupts and central processing utilization, and produce a better throughput. The embodiments also improve RAID5 write performance. The embodiments can also be extended to support other RAID levels, such as RAID6. The embodiments use only one stripe-size of local memory for data caching. This is ideal for drivers with a smaller outstanding command count. The embodiments can be used with existing drivers with coalescing support, to improve performance of low size IO. This is a modular design and can easily adapt to any driver or firmware.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of improving a serial IO operation, including at least one of a read operation of a data block and a write operation of a data block, directed to a logical disk of a computerized data storage system, the method comprising the steps of:
    reading only one stripe of data from the logical disk into a cache,
    determining whether the data block for the IO operation is included within the cache,
    when the data block for the IO operation is included within the cache, then
        for a read operation, servicing the IO operation from the cache, and
        for a write operation, updating the cache with the data block to be written, and writing only an updated parity block to the logical disk, and
    when the data block for the IO operation is not included within the cache, then
        for a read operation, reading only one new stripe of data including the data block from the logical disk into the cache, and servicing the IO operation from the cache, and
        for a write operation, reading only one new stripe of data excluding the data block from the logical disk into the cache, updating the cache with the data block to be written, and writing only an updated parity block to the logical disk.

2. The method of claim 1, wherein the logical disk is a RAID5.

3. The method of claim 1, wherein the IO operation is only serviced from the cache when the IO operation is for a data block that is smaller than one stripe.

4. A computer readable medium containing a low level device driver program, the program having logic elements for performing a serial IO operation, including at least one of a read operation of a data block and a write operation of a data block, directed to a logical disk of a computerized data storage system, by:
    reading only one stripe of data from the logical disk into a cache,
    determining whether the data block for the IO operation is included within the cache,
    when the data block for the IO operation is included within the cache, then
        for a read operation, servicing the IO operation from the cache, and
        for a write operation, updating the cache with the data block to be written, and writing only an updated parity block to the logical disk, and when the data block for the IO operation is not included within the cache, then for a read operation, reading only one new stripe of data including the data block from the logical disk into the cache, and servicing the IO operation from the cache, and for a write operation, reading only one new stripe of data excluding the data block from the logical disk into the cache, updating the cache with the data block to be written, and writing only an updated parity block to the logical disk.

* * * * *